United States Patent [19]

Yamazaki et al.

[11] Patent Number: 4,930,798
[45] Date of Patent: Jun. 5, 1990

[54] BICYCLE HANDLE ASSEMBLY

[75] Inventors: Toshimasa Yamazaki; Kazuyuki Miura; Kazuto Yamasaki, all of Sakai, Japan

[73] Assignee: Maeda Industries, Ltd., Osaka, Japan

[21] Appl. No.: 259,912

[22] Filed: Oct. 19, 1988

[30] Foreign Application Priority Data

Nov. 13, 1987 [JP] Japan .................................. 62-288160
Nov. 17, 1987 [JP] Japan .................................. 62-291578

[51] Int. Cl.⁵ .............................................. B62M 1/02
[52] U.S. Cl. .................................. 280/261; 280/264; 74/551.1; 74/551.8; 188/2 D; 188/24.11; 188/24.22
[58] Field of Search ............... 280/261, 264, 263, 270, 280/274; 74/551.1, 551.8, 551.9, 551.4, 551.5, 551.7; 188/24.11, 24.22, 2 D

[56] References Cited

U.S. PATENT DOCUMENTS 4,729,255 3/1988 Moulton .......................... 74/551.4
4,750,754 6/1988 Lennon ........................... 280/261
4,794,815 1/1989 Borromeo ....................... 74/551.4

FOREIGN PATENT DOCUMENTS 0490395 4/1919 France ........................... 188/24.21
8003904 2/1982 Netherlands ................. 188/24.22
6759 of 1891 United Kingdom ........... 74/551.4

Primary Examiner—Charles A. Marmor
Assistant Examiner—A. M. Boehler
Attorney, Agent, or Firm—William H. Eilberg

[57] ABSTRACT

A bicycle handle assembly comprises a pair of side clamps provided on a handle post, and a pair of half handle bars respectively supported by the side clamps. Each half handle bar includes a straight mounting portion extending longitudinally of the bicycle, a rest portion extending laterally outward from the mounting portion, a main grip portion provided on the rest portion at a position spaced laterally from the mounting portion, and an auxiliary grip portion disposed ahead of the rest portion and the main grip portion. The mounting portion is held by a corresponding side clamp but adjustable in position relative thereto longitudinally of the bicycle.

25 Claims, 12 Drawing Sheets

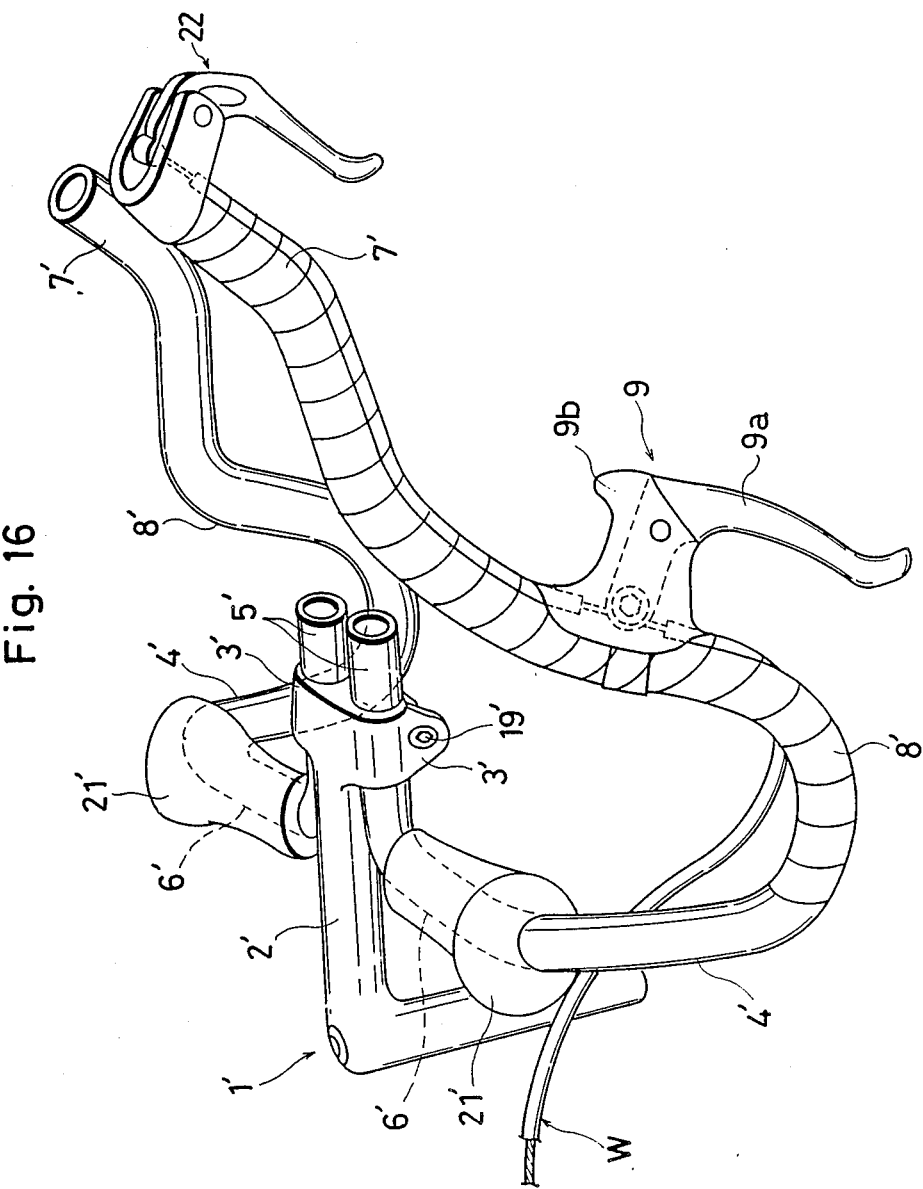

BICYCLE HANDLE ASSEMBLY

BACKGROUND OF THE INVENTION
1. Field of the Invention

This invention relates generally to bicycle handles, and more particularly to a bicycle handle assembly which enables the cyclist to assume various riding postures.

2. Description of the Prior Art

Bicycle handles may have various configurations depending on specific purposes. Most commonly used for sporting purposes (racing, touring, triathlon, etc.) are dropped-type handles.

A typical dropped-type handle comprises a main lateral portion fixed at its center to the handle stem of the bicycle, and a pair of U-shaped grip portions extending downward from the respective ends of the lateral portion. The main lateral portion provides a pair of second grips. Therefore, the dropped-type handle enables the cyclist to assume a forwardly inclined riding posture in which he (or she) grasps the U-shaped grip portions, and an upright riding posture in which he (or she) grips the main lateral portion.

The forwardly inclined riding posture minimizes air resistance during running and maximizes pedalling force to increase the achievable running speed. However, such a riding posture compels the rider to support most of the torso weight (upper body weight) by the arms, leading to a very quick fatigue of the arms. This is particularly disadvantageous in a triathlon where the competitor must ride a bicycle after a long-distance swimming which requires exhausting arm movements.

On the other hand, the upright riding posture is much more relaxing than the forwardly inclined riding posture. However, this riding posture increases air resistance during running and reduces pedalling force, so that it is disadvantageous in a neck-and-neck phase of racing.

As described above, neither riding posture provided by the known drop handle is satisfactory. Therefore, the cyclist must change between the two possible riding postures depending on various phases of cycling or racing and in consideration of exhaustive conditions of various body portions.

The dropped-type handle is generally adjustable in position only in the vertical direction by sliding the handle stem relative to the steering column. Therefore, while the level of the handle may be suitably adjusted after adjusting the level of the saddle in accordance with the rider's leg length, it is not possible to move the handle longitudinally of the bicycle to adjust the distance between the saddle and the handle in accordance with the torso length or arm length of the rider. Replacement of the handle post by another having a different lug length is a time-taking and costly solution. Movability of the saddle longitudinally of the bicycle provides only a limited range of adjustment, thus failing to afford an optimum riding posture to various riders.

SUMMARY OF THE INVENTION

It is, therefore, an object of the invention to provide a bicycle handle assembly which, with a simple construction, enables high-speed running for a long period of time with a relaxed riding posture.

Another object of the invention is to provide a bicycle handle assembly which is capable of positional adjustment longitudinally of the bicycle to provide a best riding posture for any rider.

A further object of the invention is to provide a bicycle handle assembly which provides a quick braking operation without necessity of shifting the rider's hands.

According to the invention, there is provided a bicycle handle assembly comprising a pair of side clamps provided on a handle stem, a pair of half handle bars respectively supported by the side clamps, wherein each half handle bar includes a straight mounting portion extending longitudinally of the bicycle, a rest portion extending laterally outward from the mounting portion to serve also as a first grip portion, and a second grip portion disposed ahead of the rest portion to be grasped by a rider's hand while the rest portion supports a rider's elbow; and the mounting portion is held by a corresponding side clamp but adjustable in position relative thereto longitudinally of the bicycle.

With the arrangement described above, the rider can assume a forwardly inclined riding posture by grasping the second grip portion while placing the elbow on the rest portion of each half handle bar. Such a riding posture enables high-speed running without inviting unacceptable fatigue of the arm and is therefore particularly suitable for long-distance riding as required for example in a triathlon.

The two half handle bars may be adjusted in position longitudinally of the bicycle, so that it is possible to select a best riding posture for any rider. Further, positional adjustment of each half handle bar may be effected independently of the other. Such independent adjustability enables the two half handle bars to be fixed at different positions adapted for suitably supporting both arms of the rider which may differ in length from each other.

Other objects, features and advantages of the invention will be fully understood from the following description of the preferred embodiments given with reference to the accompanying drawings.

BRIEF DESCRIPTION OF THE DRAWINGS

In the accompanying drawings:

FIG. 16 is a perspective view showing a still further bicycle handle assembly embodying the invention.

DETAILED DESCRIPTION

Figure 1:
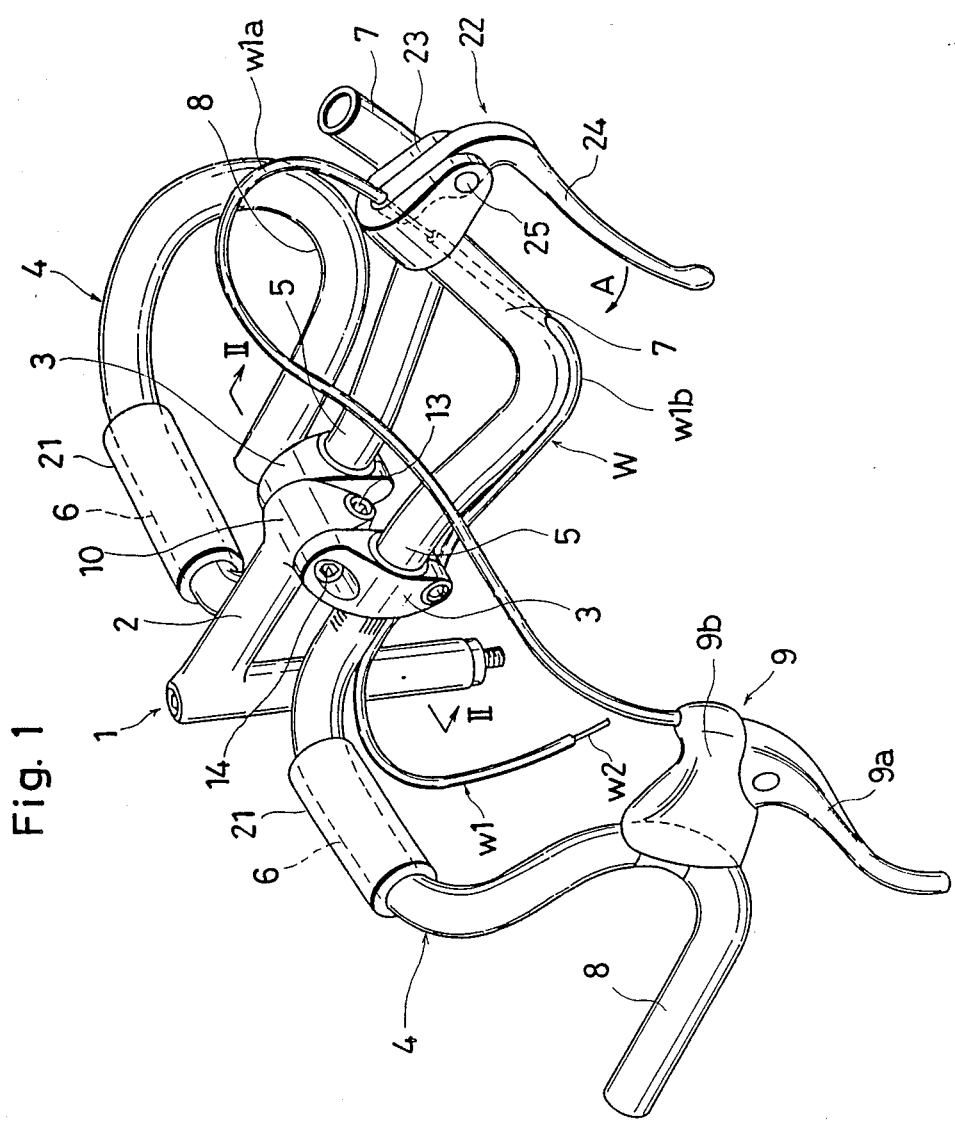
FIG. 1 is a perspective view showing a bicycle handle assembly embodying the invention.

Throughout the accompanying drawings, identical or similar parts are referred to by the same reference numerals and characters for the convenience of explanation.

Referring first to FIG. 1, a bicycle handle assembly according to the first embodiment of the invention mainly includes a pair of side clamps 3 and a pair of half handle bars 4 supported respectively by the side clamps. The side clamps 3 are laterally spaced and mounted on a central clamp 10 which is provided at the front end of the forwardly projecting handle lug 2 of a known handle stem 1.

Each half handle bar 4 has a straight mounting portion 5 extending longitudinally of the bicycle, and a rest portion 6 extending laterally outward from the rear end of the mounting portion. According to this embodiment, the rest portion 6 is integrally formed at its laterally outer end with a U-shaped main grip portion 8 which forms a known dropped grip, whereas the mounting portion 5 is integrally formed at its front end with an auxiliary grip portion 7 which extends forwardly upward.

The main grip portion 8 is provided with a known main brake control assembly 9 comprising a brake lever 9a and a brake bracket 9b. Similarly, the auxiliary grip portion 7 is provided with an auxiliary brake control assembly 22 having an arrangement hereinafter described. The main and auxiliary brake control assemblies 9, 22 are used to actuate an unillustrated brake assembly (front brake assembly for example). Though the brake control assemblies are shown only for one half handle bar 4 (right half handle bar) in FIG. 1, the other half handle bar (left handle bar) is also provided with a similar pair of brake control assemblies for actuating the other unillustrated brake assembly (rear break assembly for example).

Figure 2:
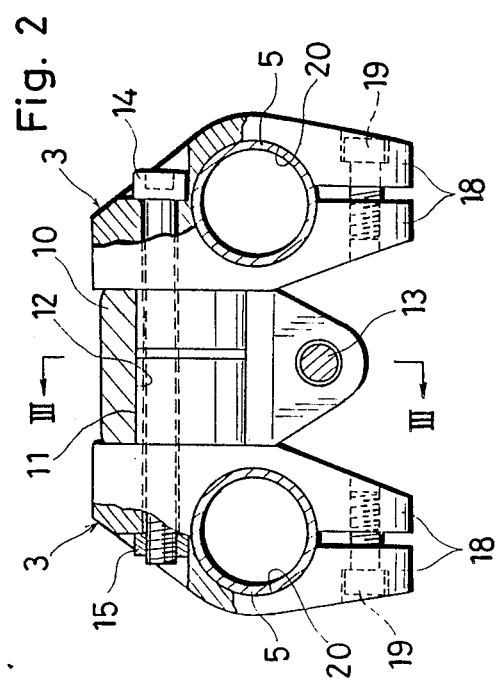
FIG. 2 is a sectional view taken on lines II—II in FIG. 1.
Figure 3:
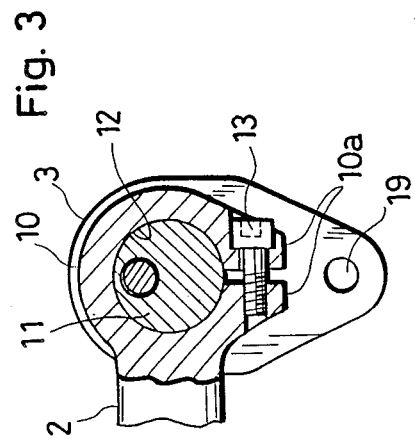
FIG. 3 is a sectional view taken on lines III—III in FIG. 2.

As illustrated in FIGS. 2 and 3, the central clamp 10 is of a known type having a lateral bore 12 which can be also used to receive a known one-piece handle bar such as a known dropped-type handle bar. Each side clamp 3 is mounted to such a known central clamp. For this purpose, the side clamp 3 has a mounting projection 11 insertable into the lateral bore 12 of the central clamp 10. The central clamp 10 has an opposed pair of divided portions 10a which are brought closer to each other by a clamping bolt 13 for diametrical reduction of the lateral bore 12, thereby firmly holding the mounting projection 11 of the side clamp 3.

A tie bolt 14 penetrates through both side clamps 3 and the lateral bore 12 to engage with a nut 15. Therefore, when the bolt 14 and the nut 15 are tightened up, the central clamp 10 is pressed between the two side clamps. In this way, it is possible to reliably prevent unexpected detachment of the side clamps 3 from the central clamp 10.

Each side clamp 3 has a through-bore 20 which extends longitudinally of the bicycle to receive the straight mounting portion 5 of a corresponding half handle bar 4. The side clamp 3 further has an opposed pair of divided portions 18 which can be brought closer to each other by means of a clamping bolt 19 to cause diametrical reduction of the through-bore 20. Therefore, when the clamping bolt 19 is tightened up, the mounting portion 5 of the half handle bar 4 is fixedly held by the side clamp 3. On the other hand, the clamping bolt 19 may be loosened to allow sliding movement of the mounting portion 5 relative to the side clamp 3, and again tightened up to lock the mounting portion 5 in the thus adjusted position.

In addition to positional adjustment longitudinally of the bicycle, the handle assembly provided by the pair of half handle bars 4 may be subjected to configurational adjustment. More specifically, each half handle bar 3 may be rotationally adjusted about the axis of the lateral bore 12 of the central clamp 10 by loosening and again tightening the clamping bolt 13. Further, the handle bar 4 may be rotationally adjusted about the longitudinal axis of the straight mounting portion by loosening and again tightening the clamping bolt 19.

Figure 5:
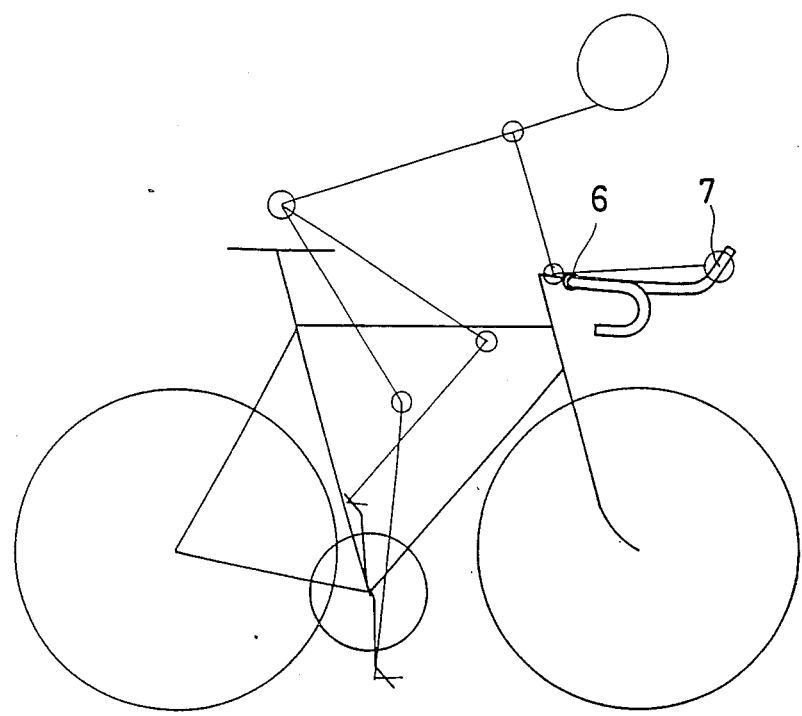
FIG. 5 is a schematic illustrative view showing a typical riding posture provided by the handle assembly of FIG. 1.
Figure 6:
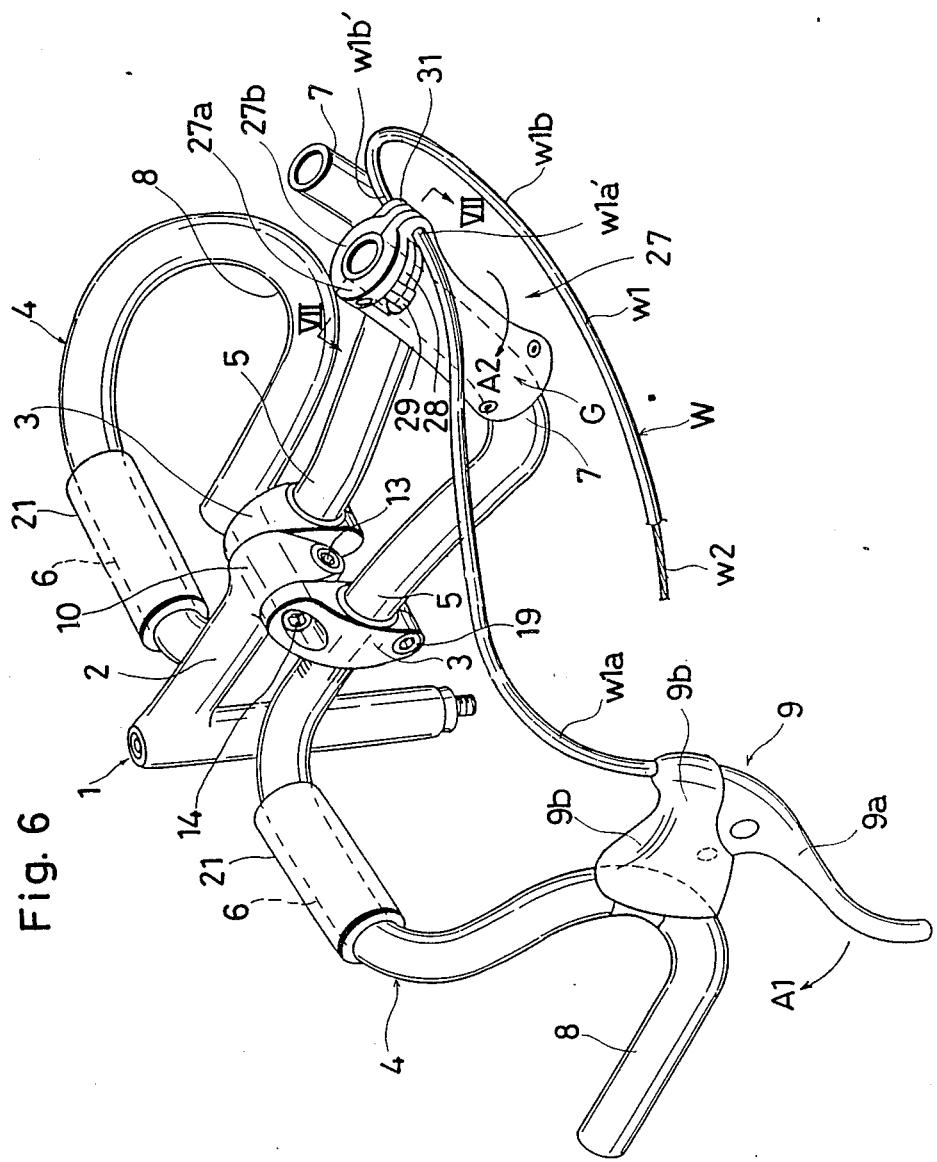
FIG. 6 is a perspective view illustrating another bicycle handle assembly embodying the invention.
Figure 9:
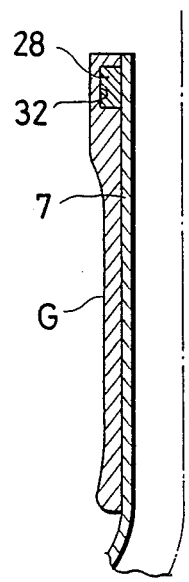
FIG. 9 is a sectional view taken on lines IX—IX in FIG. 7.

The handle assembly according to the embodiment described above allows the cyclist to assume various riding postures. For example, the cyclist may take a normal forwardly inclined posture by gripping the dropped main grip portions 8 of the respective half handle bars 4, or an upright riding posture by gripping the rest portions 6. More importantly, the rider may take another forwardly inclined posture, as shown in FIG. 5. In this posture, the cyclist places the elbows on the rest portions 6 of the respective half handle bars 4 to support his (or her) weight while grasping the auxiliary grip portions 7 for steering. Such a riding posture allows the rider to take a rest while running at a high speed with a minimized air resistance, and is therefore particularly advantageous for a triathlon wherein each competitor must ride a bicycle after a long-distance swimming which is extremely exhausting for the athlete's arms. Compared with the riding posture shown in FIG. 5, the normal forwardly inclined posture compels the cyclist to support his (or her) weight by the arms' muscular power, which is really unendurable to the rider having just finished a long-distance swimming.

Preferably, the rest portion 6 of each half handle bar 4 is provided with a cylindrical cushion pad 21 to offer a better support for the cyclist's elbow. The cushion pad 21 also serves as a grip while the cyclist assumes the upright riding posture.

As described hereinbefore, each half handle bar 3 is adjustable in position longitudinally of the bicycle and in angular orientation. It is therefore possible to select a handle position which best suits the size (torso length or arm length) or taste of a particular cyclist.

As described hereinbefore, each half handle bar 4 is provided with the main brake control assembly 9 at the main grip portion 8 as well as with the auxiliary brake control assembly 22 at the auxiliary grip portion 7. These brake control assemblies 9, 22 are connected to a corresponding brake assembly (not shown) by means of a double type control cable W consisting of an inner cable w2 and an outer cable w1 (see FIGS. 1 and 4). As is well known, the inner cable w2 has one end (not shown) connected to the brake lever 9a of the main brake control assembly 9, whereas the outer cable w1 has one end fixed to the brake bracket 9b.

Figure 4:
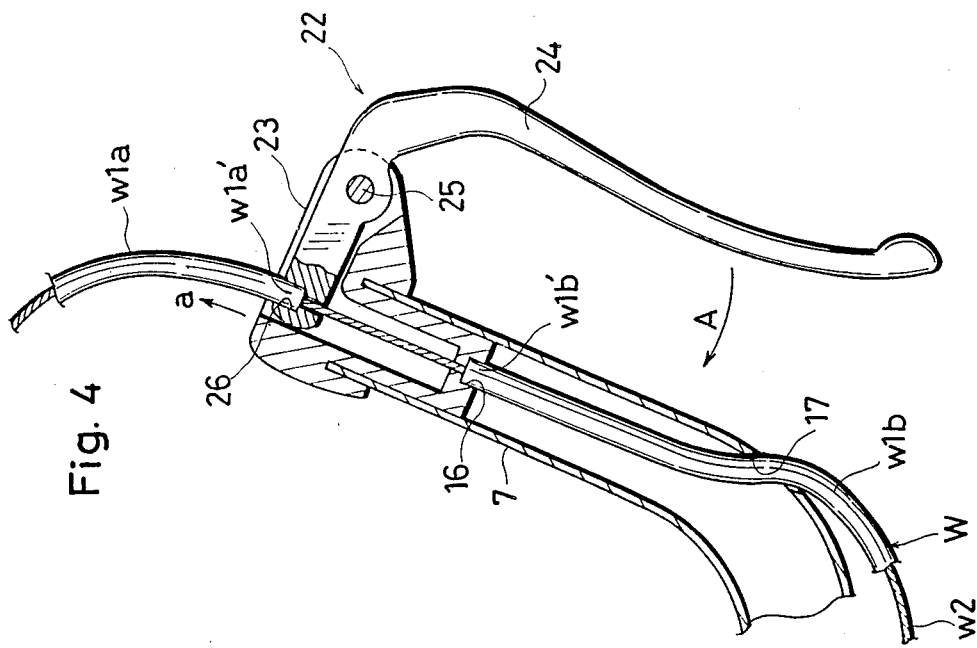
FIG. 4 is a sectional view showing an auxiliary brake control assembly included in the handle assembly of FIG. 1.

As better illustrated in FIG. 4, the auxiliary brake control assembly 22 comprises a brake bracket 23 fixed to the auxiliary grip portion 7 of the half handle bar 4, and an L-shaped brake lever 24 pivotally mounted to the bracket 23 by means of a pin 25. The outer cable w1 is divided into a first part w1a farther from the unillustrated brake assembly, and a second part w1b closer to the brake assembly. The first part w1a has a divided end w1a' received in a mounting bore 26 formed in the brake lever 24. On the other hand, the second part w1b has a divided end w1b' received in another mounting bore 16 formed in the bracket 23. Indicated at 17 is a guide hole for allowing partial entry of the double type control cable W into the auxiliary grip portion 7.

The inner cable w2 is always kept under tension by a known return spring (not shown) included in the unillustrated brake assembly, so that the brake assembly is normally held in its non-braking position. When the brake lever 9a of the main brake control assembly 9 (FIG. 1) is actuated, the inner cable w2 is pulled relative to the outer cable w1 against the return spring, thus bringing the brake assembly into its braking position.

On the other hand, when the brake lever 24 of the auxiliary brake control assembly 22 is pivoted in the direction of an arrow A in FIGS. 1 and 4, the divided end w1a' of the outer cable first part w1a is brought away from the divided end w1b' of the outer cable second part w1b, as indicated by an arrow a in FIG. 4. The length of the outer cable first part w1a is fixed at all times, as also is the length of the portion of the inner cable w2 enclosed in the outer cable first part w1a. Therefore, as long as the brake lever 9a of the main brake control assembly is kept in its non-braking position, the inner cable w2 does not slide within the outer cable first part w1a even if the outer cable divided end w1a' is moved away from the other divided end w1b'. As a result, the inner cable w2 is pulled up relative to the outer cable second part w1b to bring the unillustrated brake assembly into its braking position. In other words, the separating movement of the two divided ends w1a', w1b' causes an increase in the effective overall length of the outer cable w1, while the inner cable w2 remains unchanged in length, so that the inner cable w2 is pulled relative to the outer cable second part w1b for braking.

In this way, the cyclist can conduct an immediate braking operation by actuating the auxiliary brake control assembly 22 even when he (or she) assumes the relaxed forwardly inclined posture shown in FIG. 5. Without the auxiliary brake control assembly 22, the cyclist must shift his hand to the main brake control assembly 9, thereby causing a delay in braking operation. Such a delay can sometimes lead to a serious accident.

FIGS. 6 to 9 show another embodiment wherein a grip-type auxiliary brake control assembly 27 is employed instead of the lever-type auxiliary brake control assembly. The grip-type brake control assembly 27 is operable by rotation thereof about its own axis. This embodiment is otherwise identical to the foregoing embodiment.

Specifically, the auxiliary brake control assembly 27 comprises a fixed ring 28 mounted around the auxiliary grip portion 7 of each half handle bar 4 and having an opposed pair of divided portions 29 which are brought closer to each other by means of a clamping bolt 30 for fixation at the front end of the auxiliary grip portion 7. Unexpected rotation of the ring 28 may be more reliably prevented by a set screw 28a extending radially of the ring 28 to engage the auxiliary grip portion 7. The ring 28 further has a mounting projection 31 which is formed with a mounting bore 31a to receive the divided end w1b' of the outer cable second part w1b. The inner cable w2 completely passes through the projection 31.

The auxiliary brake control assembly 27 further comprises a substantially cylindrical grip member G consisting of a first cylinder half 27a and a second cylinder half 27b screwed the first cylinder half 27a. The grip member G is rotatably fitted on the auxiliary grip portion 7 of the half handle bar 4 and formed with an annular groove 32 to receive the fixed ring 28. The first cylinder half 27a is formed with a first opening 33a to allow the divided portions 29 of the ring 28 to project out therethrough. Similarly, the second cylinder half 27b is formed with a second opening 33b to allow the projection 31 of the ring 28 to extend out therethrough.

The grip member G is further provided with a mounting projection 34 in opposed relation to the mounting portion 31 of the fixed ring 28. The mounting projection 34 of the grip member G is formed with a mounting bore 34a to receive the divided end w1a' of the outer cable first part w1a. The inner cable w2 passes through the mounting projection 34.

Figure 7:
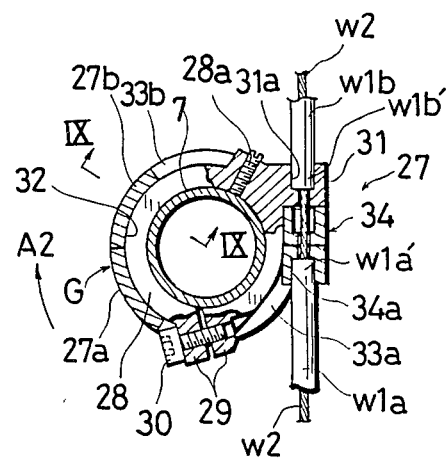
FIG. 7 is a sectional view taken on lines VII—VII in FIG. 6 to show an auxiliary brake control assembly in its non-braking position.

The inner cable w2 is kept under tension by the return spring of the unillustrated remote brake assembly, so that the mounting projections 31, 34 of the fixed ring 28 and the grip member G are held in contact with each other, as illustrated in FIG. 7. In this condition, the outer cable w1 of the double type control cable W (FIG. 6) has a minimum effective length which is maintained as long as the grip member G is not rotated. Therefore, it is possible to actuate the remote brake assembly by pivoting the brake lever 9a of the main brake control assembly 9 in the direction of an arrow A1 in FIG. 6.

Figure 8:
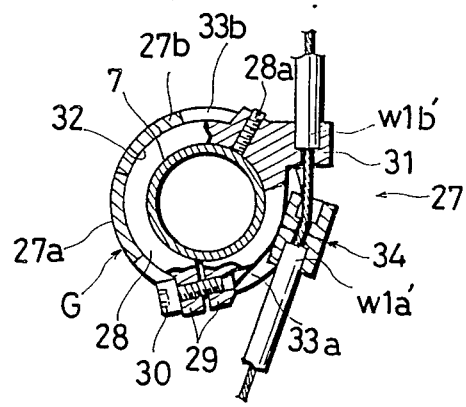
FIG. 8 is a sectional view similar to FIG. 7 but showing the auxiliary brake control assembly of FIG. 6 in its braking position.

On the other hand, when the grip member G is rotated in the direction of an arrow A2 in FIG. 7, the mounting projections 31, 34 of the fixed ring 28 and the grip member G are moved away from each other circumferentially of the grip member G with the divided ends w1a', w1b' of the outer cable w1 being correspondingly separated, as shown in FIG. 8. As a result, the effective overall length of the outer cable w1 is increased, whereas the inner cable w2 remains unchanged in length. This is equivalent to pulling the inner cable w2 relative to the second part w1b of the outer cable w1, thereby actuating the remote brake assembly.

In this way, the handle assembly shown in FIGS. 6 to 9 also enables the cyclist to selectively actuate the main or auxiliary brake control assembly 9 or 27 without any delay while allowing him (or her) to assume various riding postures including the relaxed forwardly inclined posture shown in FIG. 5.

Figure 10:
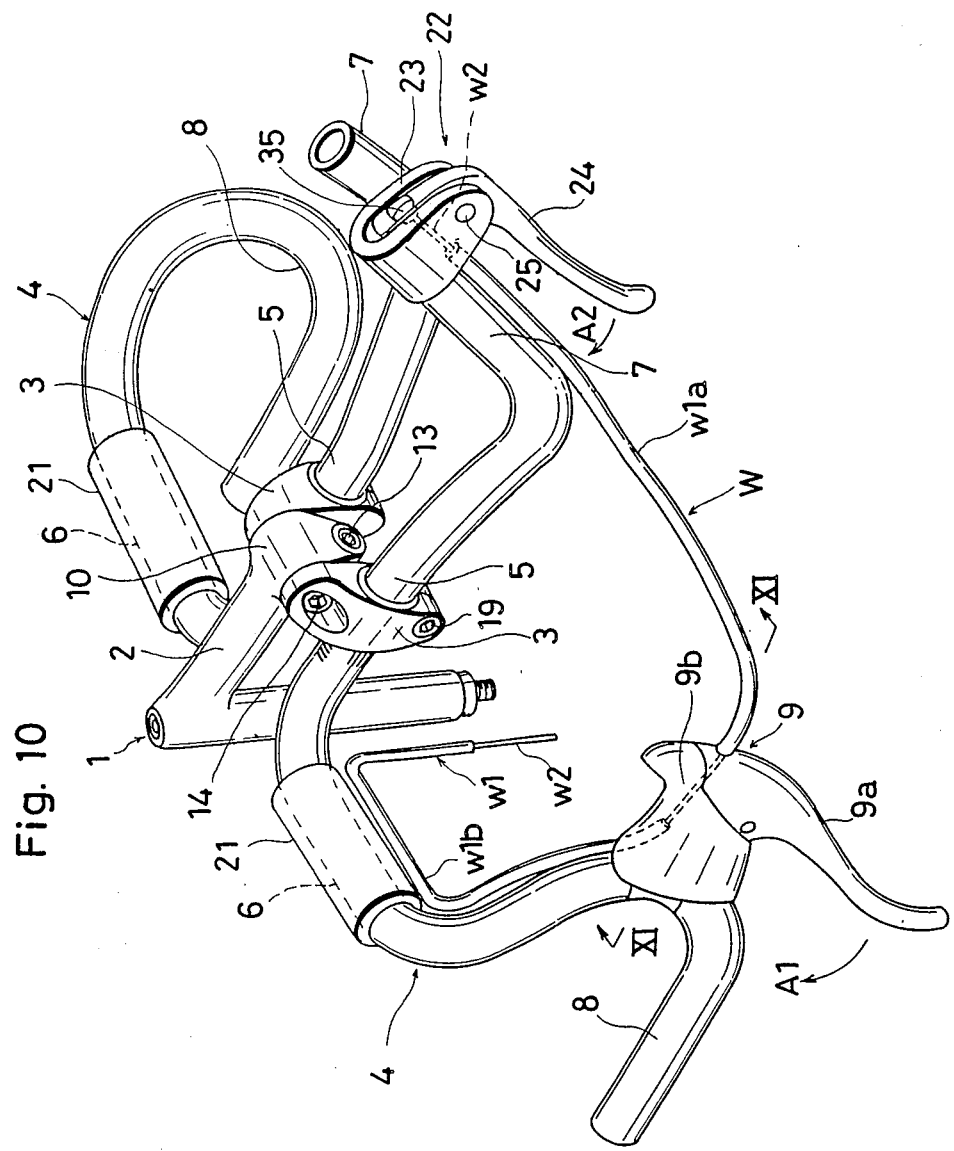
FIG. 10 is a perspective view showing a further bicycle handle assembly embodying the invention.
Figure 11:
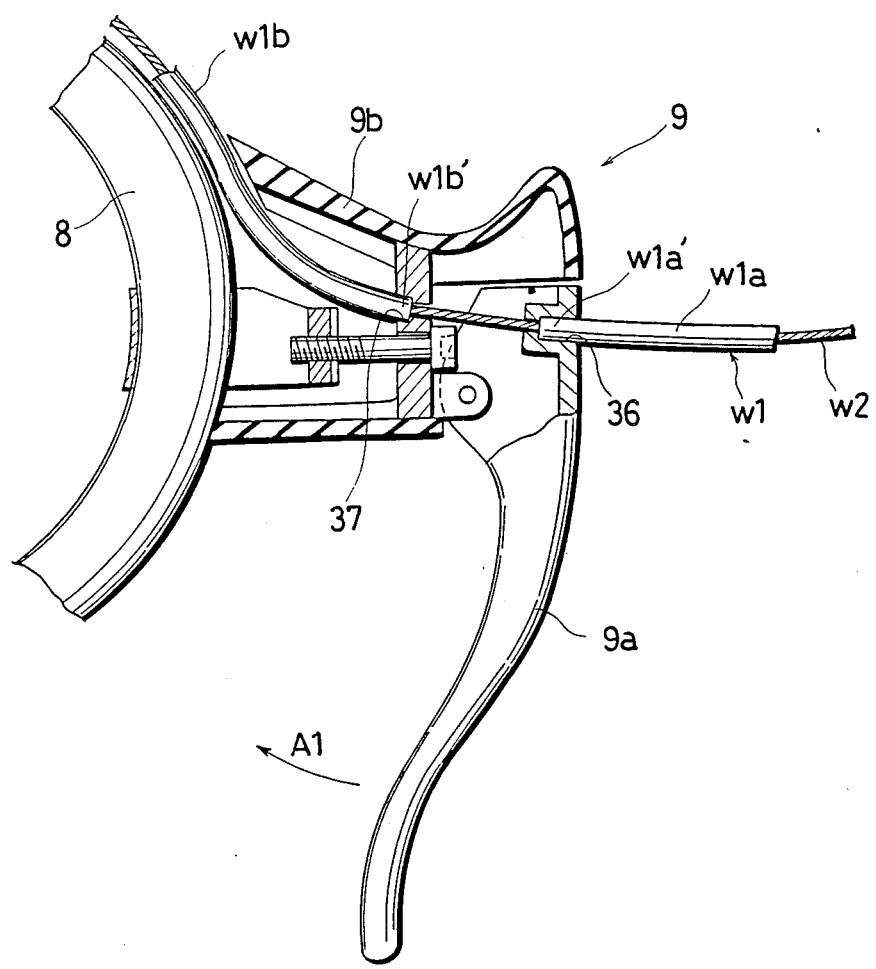
FIG. 11 is a sectional view taken on line XI—XI in FIG. 10.

FIGS. 10 and 11 show a further embodiment which comprises an auxiliary brake control assembly 22 connected to one end of the double type control cable W, whereas a main control brake assembly 9 is connected to an intermediate portion of the double cable W. This embodiment is otherwise the same as the embodiment of FIGS. 1 to 4.

As shown in FIG. 10, the auxiliary brake control assembly 22 includes a brake bracket 23 fixed to the front end of the grip portion 7 of each half handle bar 4, and an L-shaped brake lever 24 pivoted to the bracket 23 by means of a pin 25. The inner cable w2 of the double cable W has one end formed with a flange 35 engaging the lever 24, while the outer cable w1 has one end fixed to the bracket 23. Therefore, the pivotal movement of the lever 24 in the direction of the arrow A2 causes direct pulling of the inner cable w2 for actuating the remote brake assembly (not shown).

As illustrated in FIG. 11, the main brake control assembly 9 similarly includes a brake bracket 9b fixed to the main grip portion 8 of the half handle bar 4, and a brake lever 9a pivoted to the bracket 9b. The divided end w1a' of the outer cable first part w1a is received in a mounting bore 36 formed in the lever 9a. On the other hand, the divided end w1b' of the outer cable second part w1b is received in a mounting bore 37 formed in the bracket 9b. Thus, the pivotal movement of the lever 9a in the direction of the arrow A1 causes separation of the two divided ends w1a', w1b' of the outer cable w1, thereby actuating the remote brake assembly in the same manner as already described.

Figure 12:
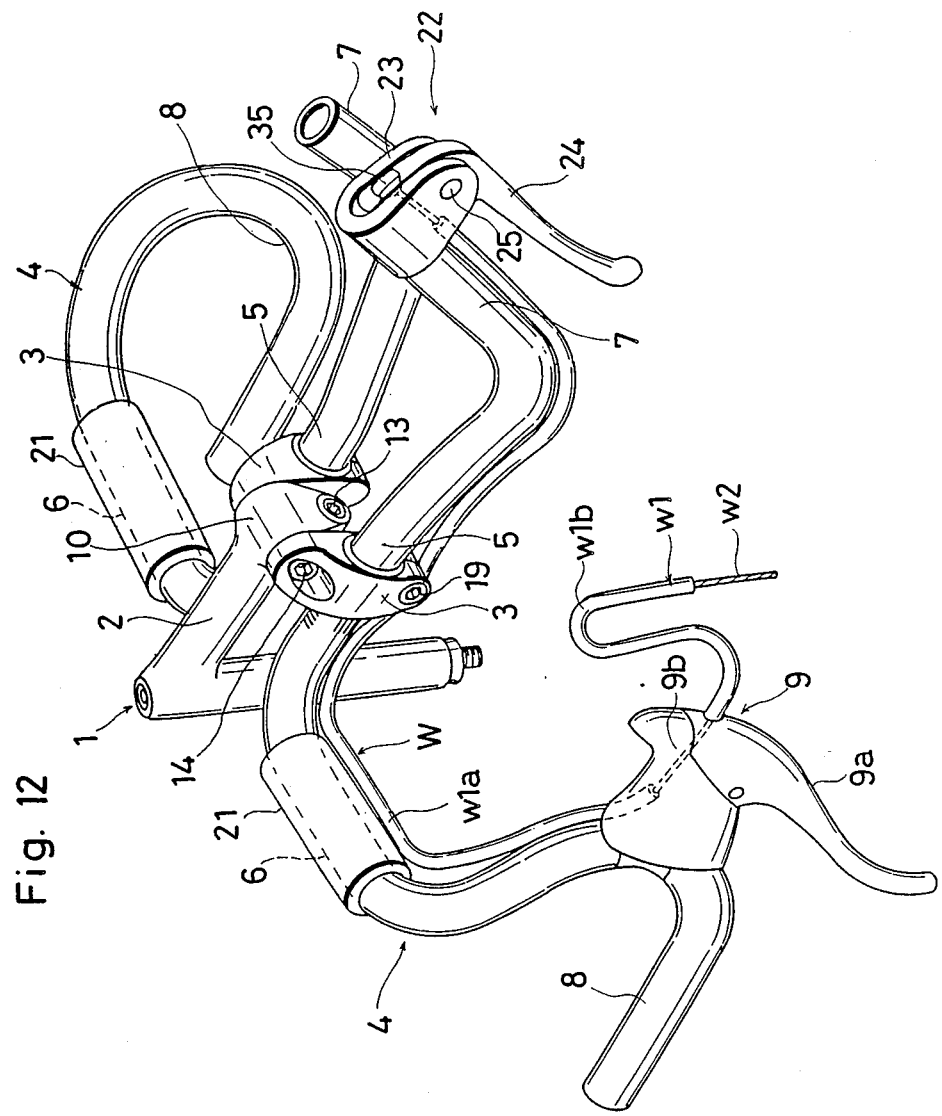
FIG. 12 is a perspective view showing still another bicycle handle assembly embodying the invention.

FIG. 12 illustrates a slight modification from the embodiment of FIGS. 10 and 11. According to this modification, the divided end w1a' of the outer cable first part w1a is received in the mounting bore 37 of the bracket 9a, whereas the divided end w1b' of the outer cable second part w1b is received in the mounting bore 36 of the lever 9a (in FIG. 11, exchange reference characters "w1a" and "w1a'" with "w1b" and "w1b'" respectively).

Figure 13:
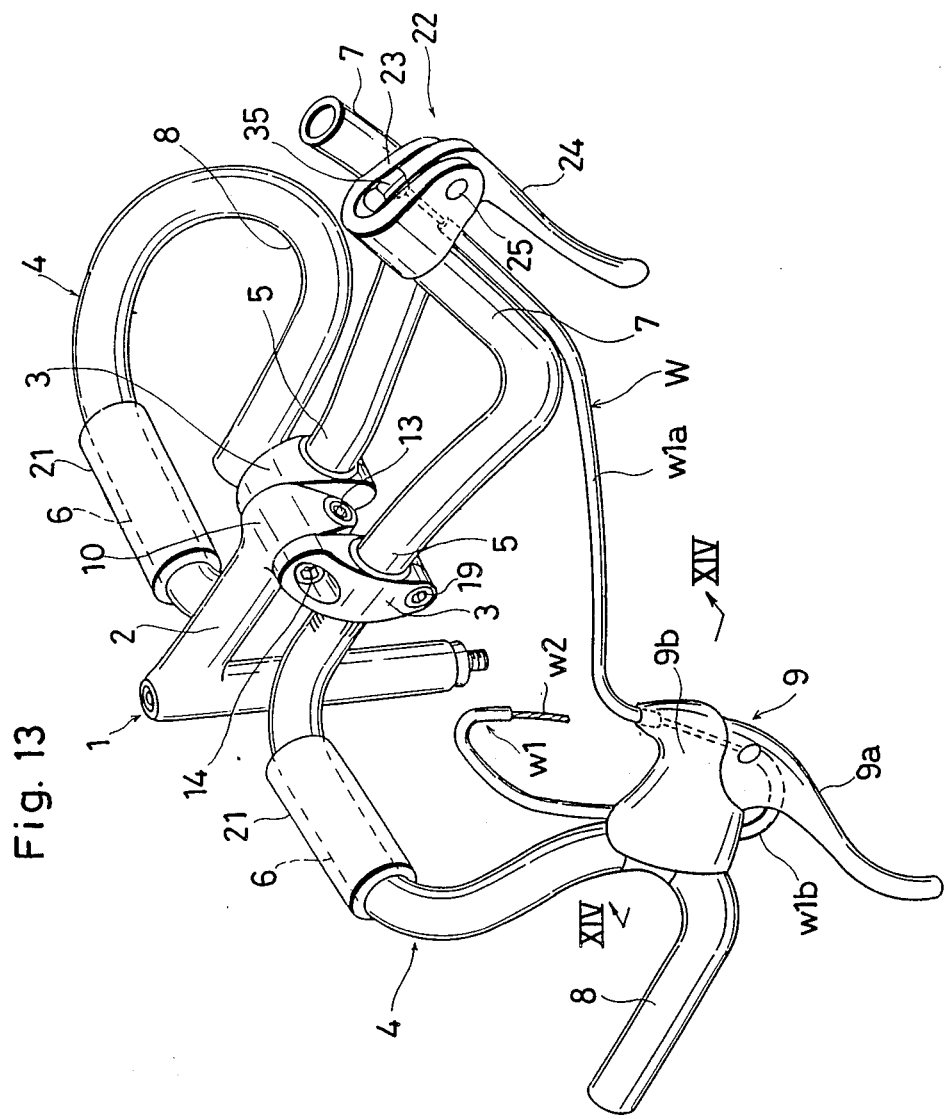
FIG. 13 is a perspective view showing still another bicycle handle assembly embodying the invention.
Figure 14:
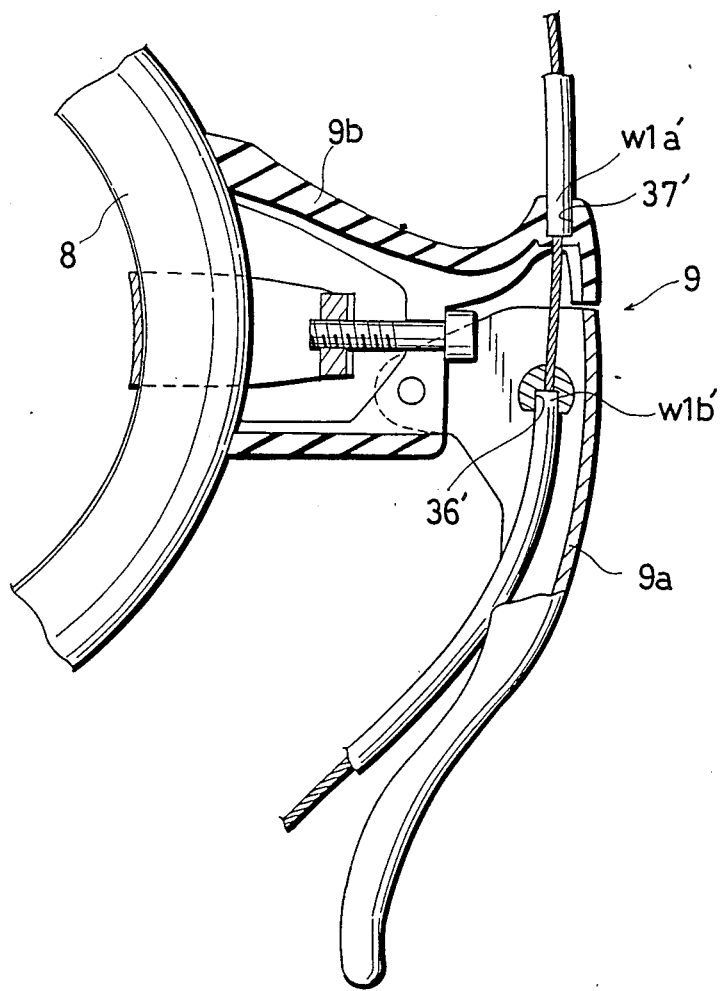
FIG. 14 is a sectional view taken on lines XIV—XIV in FIG. 13.

Still another embodiment shown in FIGS. 13 and 14 is substantially the same as the embodiment of FIG. 12 except that the divided end w1a' of the outer cable first part w1a is received in an upwardly opening mounting bore 37' of the brake bracket 9b, whereas the divided end w1b' of the outer cable second part w1b is received in a downwardly opening mounting bore 36' of the brake lever 9a.

In any of the foregoing embodiments, one brake control assembly connected to a non-divided end of the double type control cable W acts to directly pull the inner cable w2 relative to the entirety of the outer cable w1 for braking, while the other brake control assembly connected to an intermediate position of the outer cable w1 serves to separate the divided ends w1a', w1b' of the outer cable first and second parts w1a, w1b with the result that the effective overall length of the outer cable w1 is increased to indirectly pull the inner cable w2 relative to the second part w1b of the outer cable w1. Therefore, the combined brake control assemblies of each foregoing embodiment works according to the same operating principle.

Figure 15:
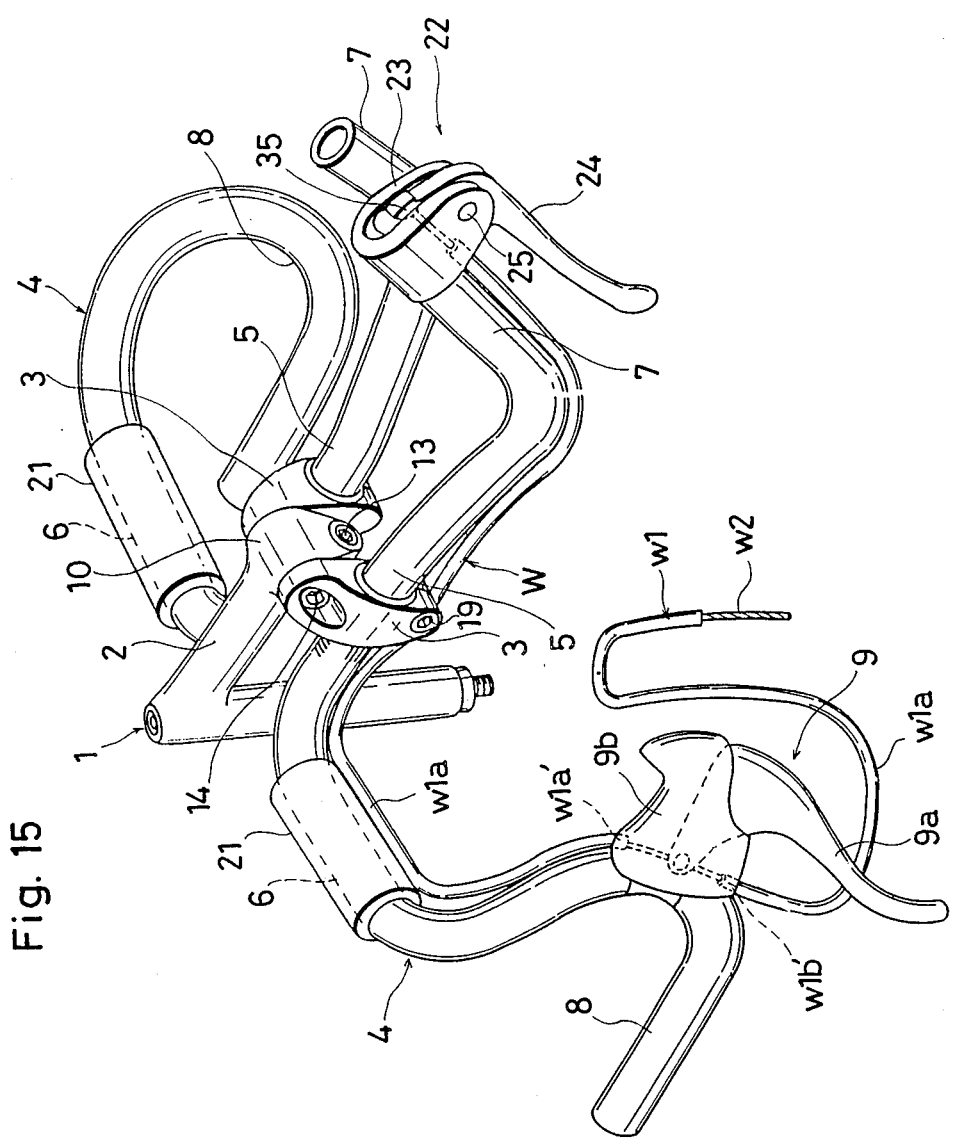
FIG. 15 is a perspective view showing still another bicycle handle assembly embodying the invention.

FIG. 15 shows two brake control assemblies 9, 22 which are combined to work slightly differently from those in the foregoing embodiments. More specifically, the two divided ends w1a', w1b' of the outer brake first and second parts w1a, w1b are fixed, from above and below respectively, to the bracket 9b of the main brake control assembly 9, while the lever 9a thereof is connected to the inner cable w2 intermediate the two divided ends of the outer cable w1. The auxiliary brake control assembly 22 is connected to the double type control cable W in the same manner as illustrated in FIG. 10.

According to the arrangement shown in FIG. 15, the brake lever 9a or 24 of either brake control assembly 9 or 22 directly applies a pull to the inner cable w2 for braking when pivotally actuated by the cyclist. Therefore, this embodiment is different in operating principle from each foregoing embodiment which, in one braking operation, relies on the separating movement of the divided ends w1a', w1b' of the outer cable w1 to indirectly pull the inner cable w2.

FIG. 16 shows another handle assembly which comprises a pair of half handle bars 4' each including a straight mounting portion 5' extending longitudinally of the bicycle and adjustably fixed by a pair of side clamps 3'. A rest portion 6' extends laterally outward from the rear end of the mounting portion 5' and provided at its laterally outer end with a U-shaped main grip portion 8'. Similarly to the foregoing embodiments, the rest portion 6' is surrounded by a generally cylindrical cushion pad 21'.

According to the embodiment of FIG. 16, the main grip portion 8' is extended forwardly and inwardly to provide an auxiliary grip portion 7' which is positioned in front of the rest portion 6'. Further, each side clamp 3' is formed integral with the handle lug 2' of the handle post 1'. On the other hand, a main brake control assembly 9 at the main grip portion 8' and an auxiliary brake assembly at the auxiliary grip portion 7' are connected to a double type control cable W in the substantially same manner as in the embodiment of FIG. 15.

Obviously, the handle assembly illustrated in FIG. 16 enables the cyclist to assume the relaxed forwardly inclined riding posture shown in FIG. 5 in addition to the normal forwardly inclined riding posture and the upright riding posture. Further, the combination of the two brake control assemblies makes it possible for the rider to conduct a quick braking operation during high speed running with either of the two forwardly inclined riding postures.

The invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

We claim:

1. A bicycle handle assembly comprising a pair of side clamps provided on a handle stem, the side clamps being disposed substantially symmetrically around the stem, the stem being located on the longitudinally axis of a bicycle, and a pair of separate half handlebars respectively supported by said side clamps, wherein:

each half handlebar is made of a single integral piece, each half handlebar includes a straight mounting portion extending longitudinally of the bicycle, on either side of said longitudinally axis, each mounting portion being held by a corresponding side clamp, a rest portion located behind said corresponding side clamp and extending laterally outward from said mounting portion to serve also as a first grip portion, and a second grip portion extending forward from said mounting portion to be located ahead of said corresponding side clamp, said second grip portion being grasped by a rider's hand while said rest portion support a rider's elbow, and said mounting portion is adjustable in position relative to said corresponding side clamp so that said rest portion and said second grip portion are simultaneously adjusted in position longitudinally of the bicycle, wherein each half handlebar further includes a third grip portion extending downward from said rest portion to provide a dropped grip.

2. The handle assembly according to claim 1, wherein said second grip portion extends forwardly upward from said mounting portion.

3. The handle assembly according to claim 1, wherein said rest portion is surrounded by a substantially cylindrical cushion pad.

4. The handle assembly according to claim 1, wherein each side clamp is formed with a through-bore to receive said mounting portion as well as with an opposed pair of divided portions to cause diametrical contraction and expansion of said through-bore by means of a clamping bolt.

5. The handle assembly according to claim 1, wherein said handle stem has a forwardly extending handle lug to which said pair of side clamps are removably mounted.

6. The handle assembly according to claim 5, wherein said handle lug has an integral central clamp which is formed with a lateral bore extending perpendicularly to said mounting portion as well as with an opposed pair of divided portions to cause diametrical contraction and expansion of said lateral bore by means of a clamping bolt, and each side clamp has a mounting projection insertable into said lateral bore.

7. The handle assembly according to claim 6, further comprising a tie bolt penetrating through said pair of side clamps and said lateral bore for engagement with a nut to prevent unexpected detachment of said pair of side clamps from said central clamp.

8. A bicycle handle assembly comprising a pair of side clamps provided on a handle stem, and a pair of separate half handlebars respectively supported by said side clamps, wherein:
   each half handlebar is made of an integral piece,
   each half handlebar includes a straight mounting portion extending longitudinally of the bicycle and held by a corresponding side clamp, a rest portion located behind said corresponding side clamp and extending laterally outward from said mounting portion to serve also as a first grip portion, and a second grip portion extending forward from said mounting portion to be located ahead of said corresponding side clamp, said second grip portion being grasped by a rider's hand while said rest portion supports a rider's elbow, and
   said mounting portion is adjustable in position relative to said corresponding side clamp so that said rest portion and said second grip portion are simultaneously adjusted in position longitudinally of the bicycle,
   wherein each half handlebar further includes a third grip portion extending downward from said rest portion to provide a dropped grip,
   further comprising a main brake control assembly arranged at said third grip portion, and an auxiliary brake control assembly arranged at said second grip portion, wherein one of the two brake control assemblies is connected to one end of a control cable while the other of the two brake control assemblies is connected to an intermediate portion of said control cable.

9. The handle assembly according to claim 8, wherein said control cable comprises an inner cable, and an outer cable surrounding said inner cable and divided at an intermediate portion thereof to provide a pair of divided ends, one divided end of said outer cable being arrested by a fixed part of said other brake control assembly, the other divided end of said outer cable being caught by a manually movable part of said other brake control assembly.

10. The handle assembly according to claim 9, wherein said fixed part of said other brake control assembly is in the form of a brake bracket while said manually movable part is in the form of a brake lever pivoted to said bracket.

11. The handle assembly according to claim 9, wherein said fixed part of said other brake control assembly is in the form of a fixed ring while said manually movable part is in the form of a substantially cylindrical grip member which is manually rotatable relative to said fixed member.

12. The handle assembly according to claim 8, wherein said control cable comprises an inner cable, and an outer cable surrounding said inner cable and divided at an intermediate portion thereof to provide a pair of divided ends, both divided ends of said outer cable being arrested by a fixed part of said other brake control assembly, said inner cable being connected to a manually movable part of said other brake control assembly at a position between said pair of divided ends of said outer cable.

13. A bicycle handle assembly comprising a pair of side clamps provided on a handle stem, a pair of separate half handlebars respectively supported by said side clamps, and brake control means mounted on at least one of said half handle bars, wherein:
   each half handlebar includes a straight mounting portion extending longitudinally of the bicycle, a rest portion extending laterally outward from said mounting portion to serve also as a first grip portion, a second grip portion disposed ahead of said rest portion to be grasped by a rider's hand while said rest portion supports a rider's elbow, and a third grip portion extending downward from said rest portion to provide a dropped grip,
   said mounting portion is held by a corresponding side clamp but adjustable in position relative thereto, longitudinally of the bicycle,
   said brake control means comprises a main brake control assembly arranged at said third grip portion, and an auxiliary brake control assembly arranged at said second grip portion, one of the two brake control assemblies being connected to one end of a control cable, the other of the two brake control assemblies being connected to an intermediate portion of said control cable.

14. The handle assembly according to claim 13, wherein said second grip portion extends forwardly upward from said mounting portion.

15. The handle assembly as defined in claim 13, wherein said second grip portion extends forwardly inward from said third grip portion.

16. The handle assembly according to claim 13, wherein said rest portion is surrounded by a substantially cylindrical cushion pad.

17. The handle assembly according to claim 13, wherein each side clamp is formed with a through-bore to receive said mounting portion as well as with an opposed pair of divided portions to cause diametrical contraction and expansion of said through-bore by means of a clamping bolt.

18. The handle assembly according to claim 13, wherein said handle stem has a forwardly extending handle lug which is formed integrally with said pair of side clamps.

19. The handle assembly according to claim 13, wherein said handle stem has a forwardly extending handle lug to which said pair of side clamps are removably mounted.

20. The handle assembly according to claim 19, wherein said handle lug has an integral central clamp which is formed with a lateral bore extending perpendicularly to said mounting portion as well as with an opposed pair of divided portions to cause diametrical contraction and expansion of said lateral bore by means of a clamping bolt, and each side clamp has a mounting projection insertable into said lateral bore.

21. The handle assembly according to claim 20, further comprising tie bolt penetrating through said pair of side clamps and said lateral bore for engagement with a nut to prevent unexpected detachment of said pair of side clamps from said central clamp.

22. The handle assembly according to claim 13, wherein said control cable comprises an inner cable, and an outer cable surrounding said inner cable and divided at an intermediate portion thereof to provide a pair of divided ends, one divided end of said outer cable being arrested by a fixed part of said other brake control assembly, the other divided end of said outer cable being caught by a manually movable part of said other brake control assembly.

23. The handle assembly according to claim 22, wherein said fixed part of said other brake control assembly is in the form of a brake bracket while said manually movable part is in the form of a brake lever pivoted to said bracket.

24. The handle assembly according to claim 22, wherein said foxed part of said other brake control assembly is in the form of a fixed ring while said manually movable part is in the form of a substantially cylindrical grip member which is manually rotatable relative to said fixed member.

25. The handle assembly according to claim 13, wherein said control cable comprises an inner cable, and an outer cable surrounding said inner cable and divided at an intermediate portion thereof to provide a pair of divided ends, both divided ends of said outer cable being arrested by a fixed part of said other brake control assembly, said inner cable being connected to a manually movable part of said other brake control assembly at a position between said pair of divided ends of said outer cable.

* * * * *